United States Patent [19]
Perry et al.

[11] Patent Number: 5,641,259
[45] Date of Patent: Jun. 24, 1997

[54] INSERTER FOR A ROTATABLE STORAGE STRUCTURE

[75] Inventors: Daniel C. Perry, San Jose; Timothy E. Gorham, Jr., Oakland, both of Calif.

[73] Assignee: Computer Aided Systems, Inc., Hayward, Calif.

[21] Appl. No.: 448,811

[22] Filed: May 24, 1995

Related U.S. Application Data

[62] Division of Ser. No. 193,827, Feb. 7, 1994, abandoned.

[51] Int. Cl.⁶ ...................................................... B65G 1/04
[52] U.S. Cl. ........................ 414/268; 414/277; 414/331
[58] Field of Search ................................... 414/268, 269, 414/273, 277, 278, 285, 286, 331; 312/125; 211/1.52, 78, 131, 163; 198/803.01

[56] References Cited

U.S. PATENT DOCUMENTS

| | | |
|---|---|---|
| 844,806 | 2/1907 | Jones . |
| 931,570 | 8/1909 | Courtney . |
| 1,135,316 | 4/1915 | Olson . |
| 2,734,617 | 2/1956 | Temple . |
| 3,448,870 | 6/1969 | Gallo et al. . |
| 3,593,862 | 7/1971 | Pierson . |
| 3,719,288 | 3/1973 | Schmitt et al. . |
| 3,750,804 | 8/1973 | Lemelson . |
| 3,780,852 | 12/1973 | Weiss et al. . |
| 4,389,157 | 6/1983 | Bernard et al. ................... 414/278 X |
| 4,422,554 | 12/1983 | Lichti ................................. 211/1.5 |
| 4,651,863 | 3/1987 | Reuter et al. . |
| 4,804,307 | 2/1989 | Motoda ............................. 414/273 X |
| 4,958,976 | 9/1990 | Haueter ............................. 414/268 X |
| 4,968,207 | 11/1990 | Lichti ................................. 414/331 |
| 4,983,091 | 1/1991 | Lichti, Sr. et al. ................ 414/331 |
| 5,328,316 | 7/1994 | Hoffman ........................... 414/277 X |
| 5,336,032 | 8/1994 | Pipes ................................. 414/331 |

FOREIGN PATENT DOCUMENTS

| | | |
|---|---|---|
| 242409 | 10/1987 | European Pat. Off. . |
| 272340 | 6/1988 | European Pat. Off. . |
| 59-48306 | 3/1984 | Japan . |
| 59-212304 | 12/1984 | Japan ................................. 414/331 |
| 617108 | 1/1986 | Japan . |

*Primary Examiner*—James W. Keenan
*Attorney, Agent, or Firm*—Fish & Richardson P.C.

[57] ABSTRACT

An inserter assembly for inserting containers onto a storage carousel. The containers may be inserted by moving them horizontally in a direction tangent to a curved portion of the storage carousel. The container is then latched into the rack by raising a vertically movable horizontal lifting member to lift the lower outside edge of the container and tilt the container toward the carousel to engage a latching mechanism on the rack. The latching mechanism includes leading and trailing hooks with a smooth and continuous bottom surface, with the leading hook having an inclined wing sufficiently wide to rest on the upper leading inside corner of the container until it hangs over the inside of the container.

6 Claims, 16 Drawing Sheets

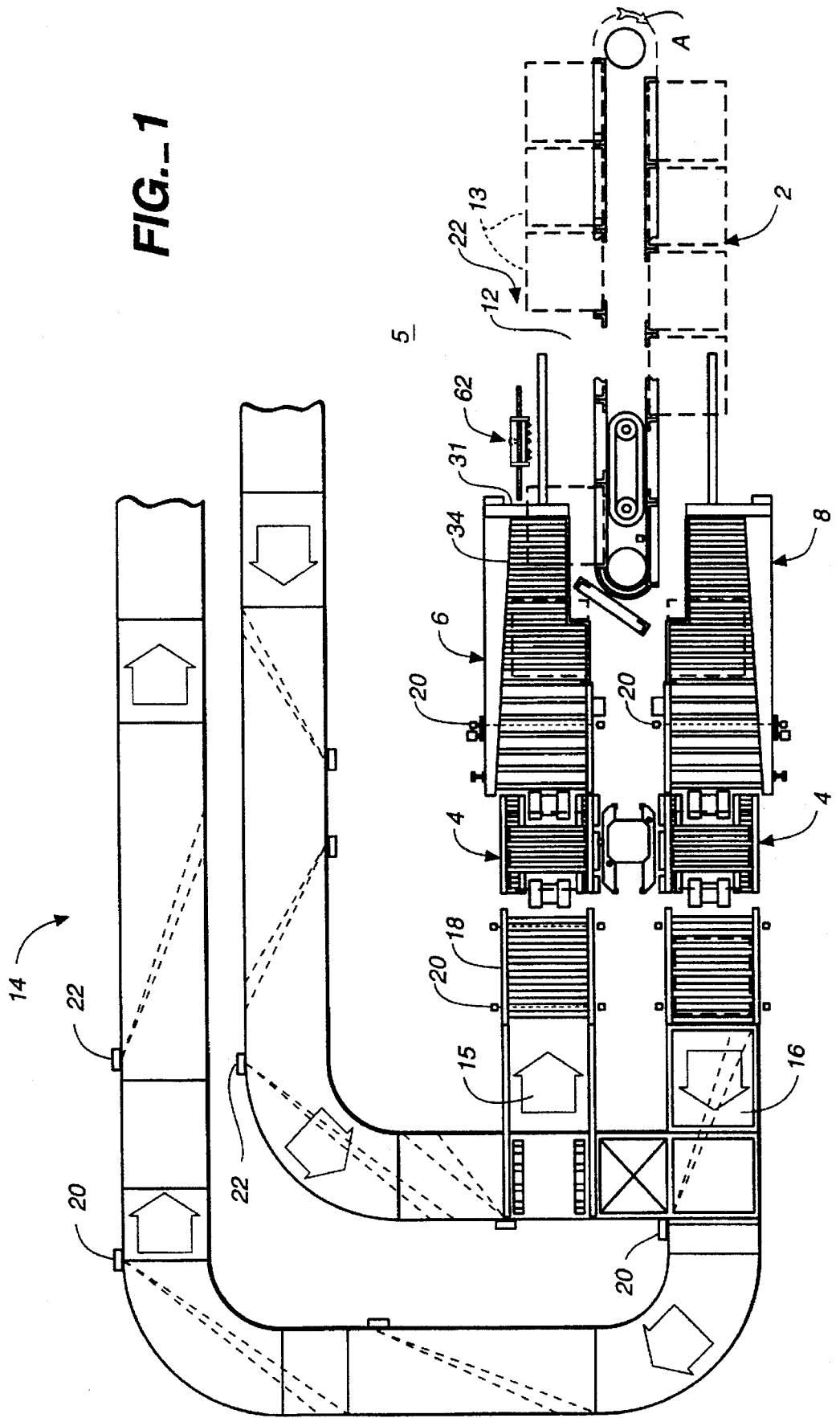

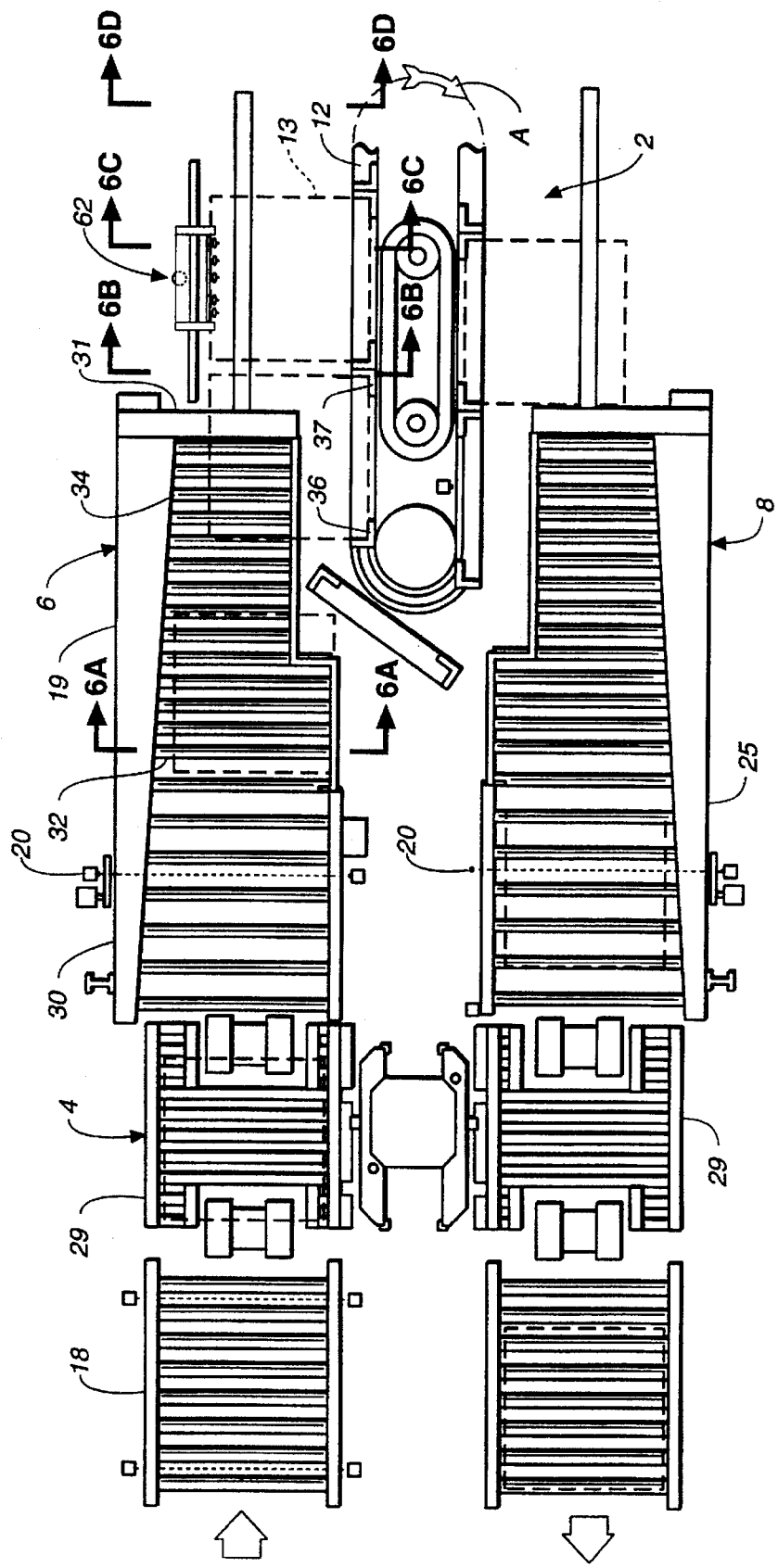
FIG._2

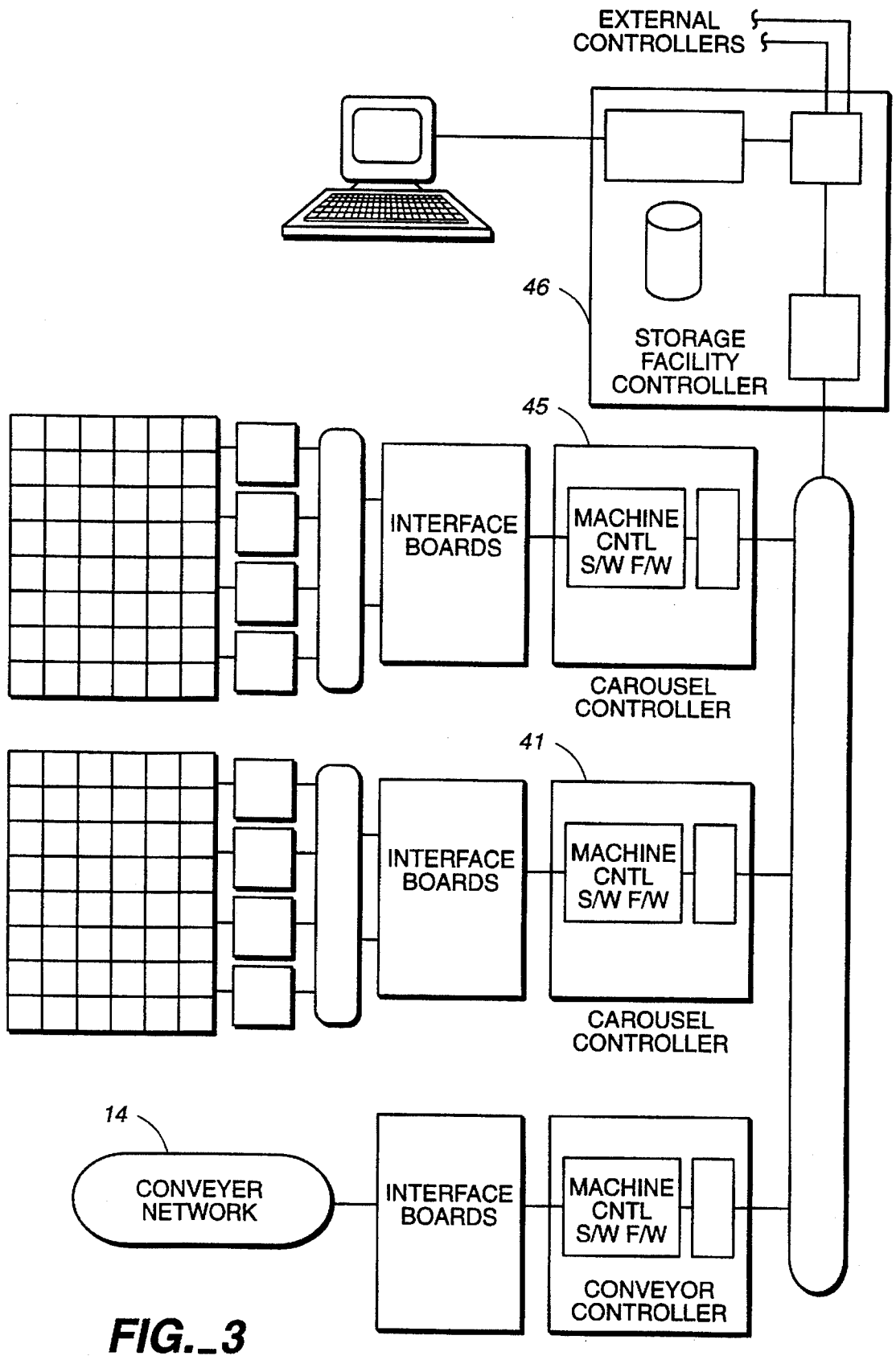
FIG._3

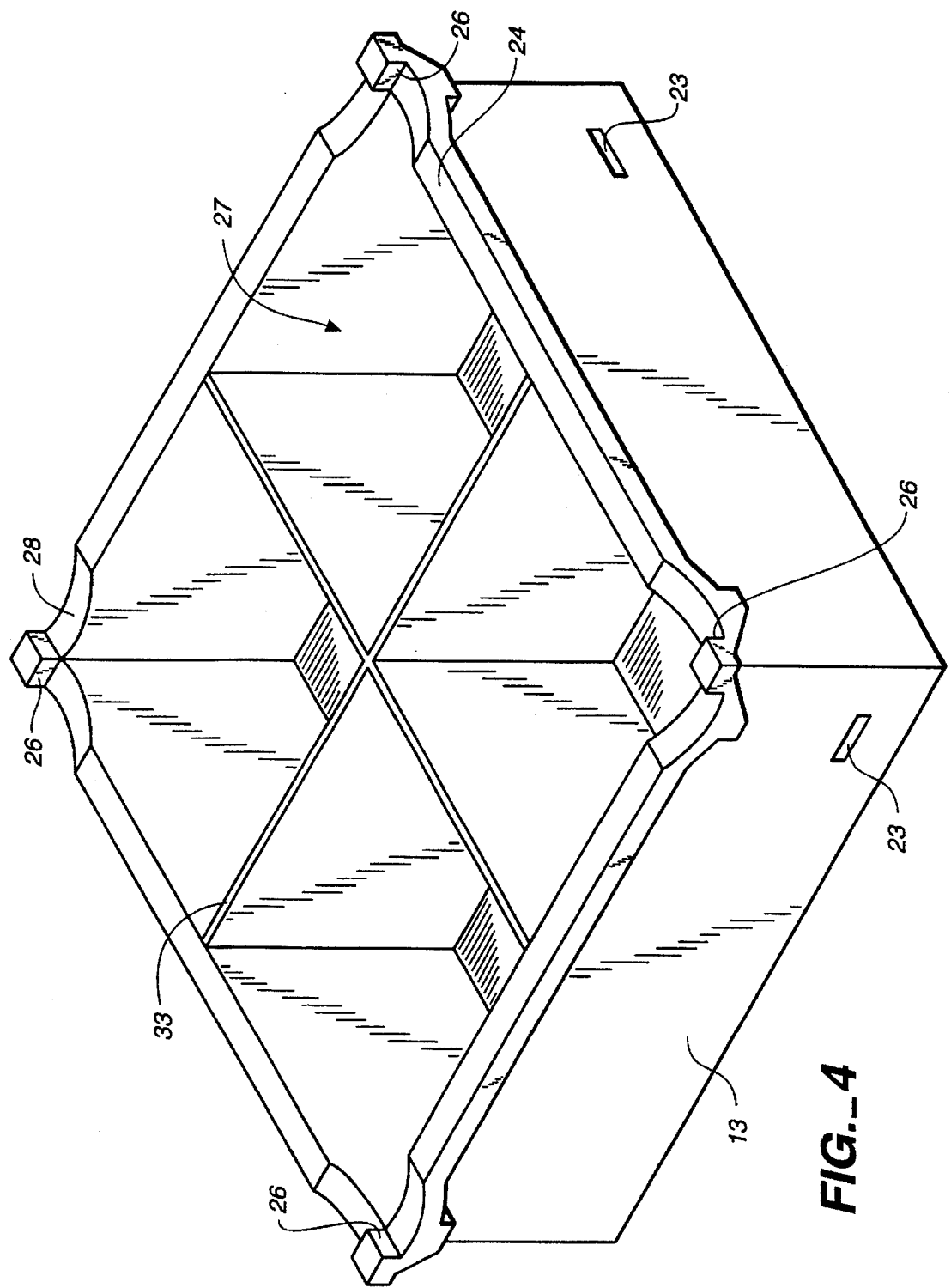
FIG._4

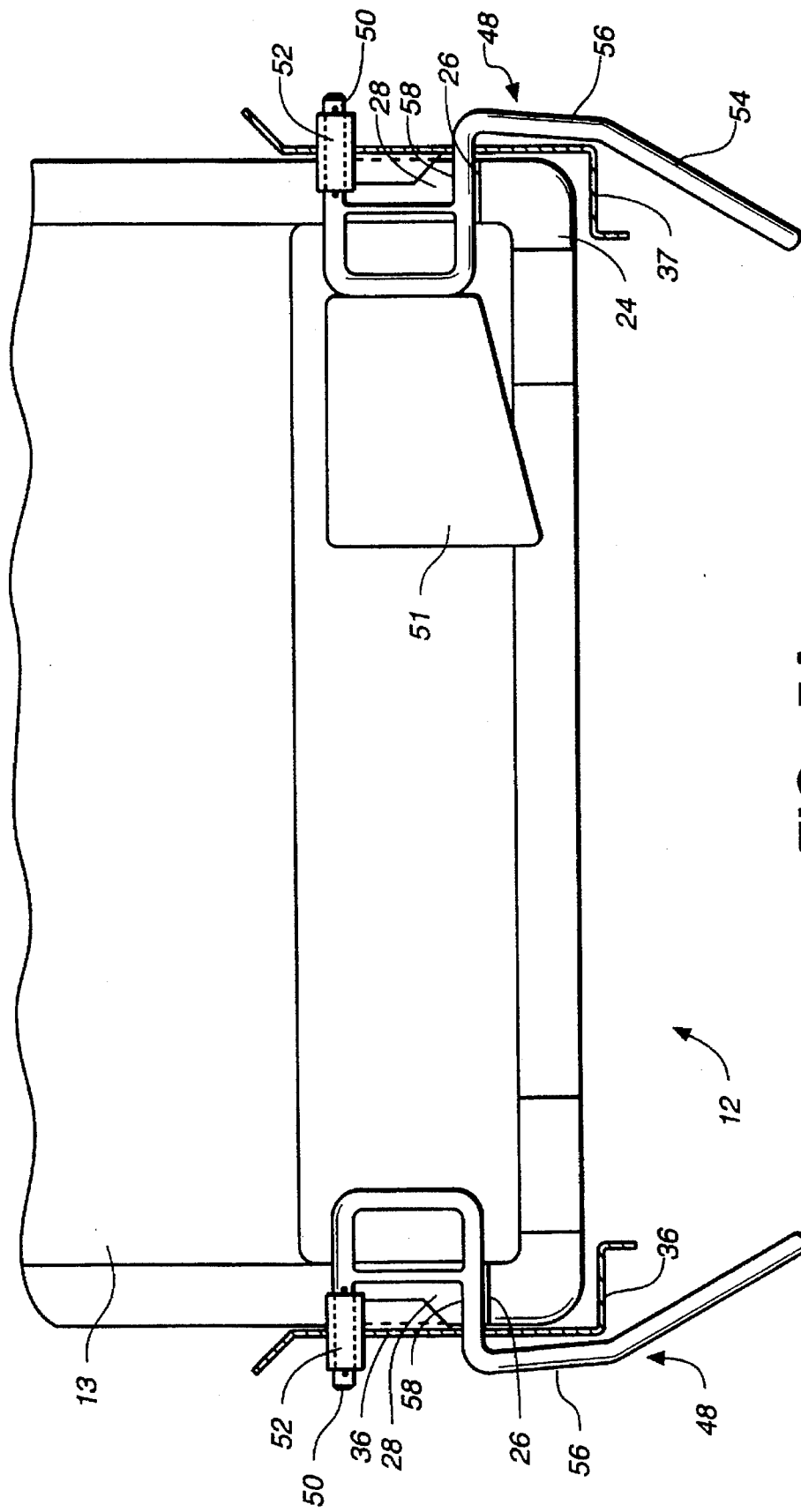

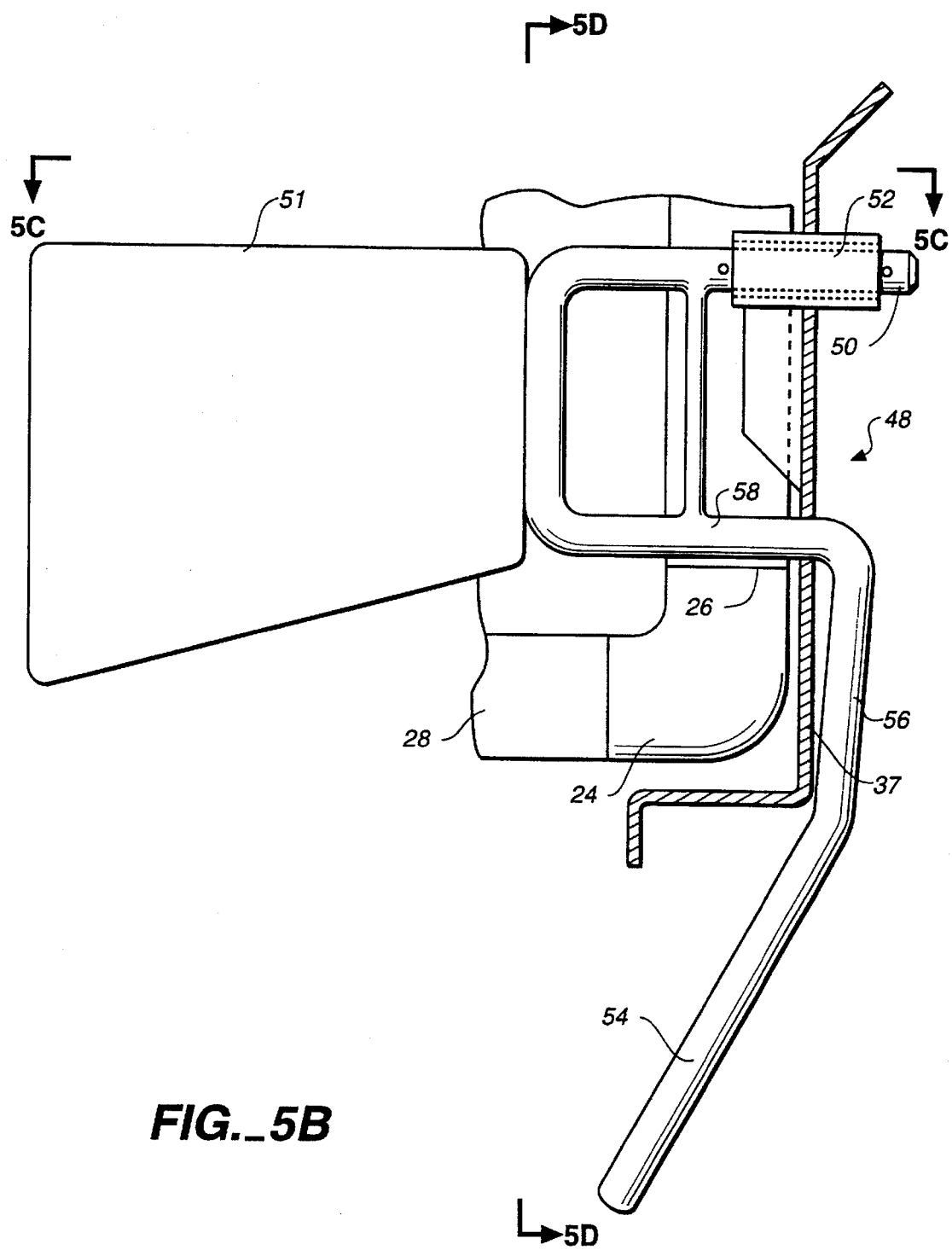
FIG._5B

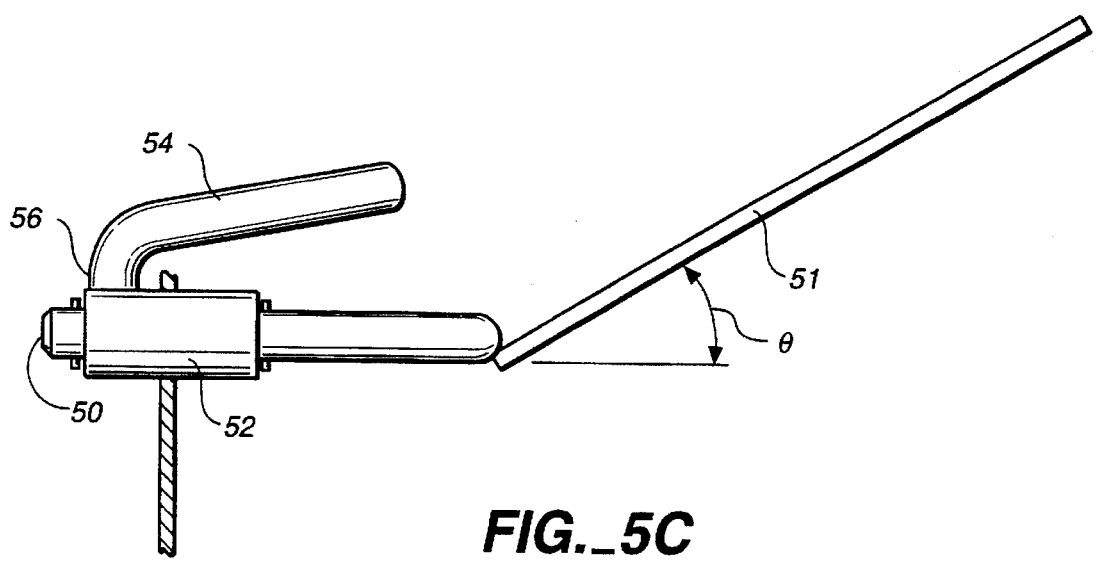
FIG._5C

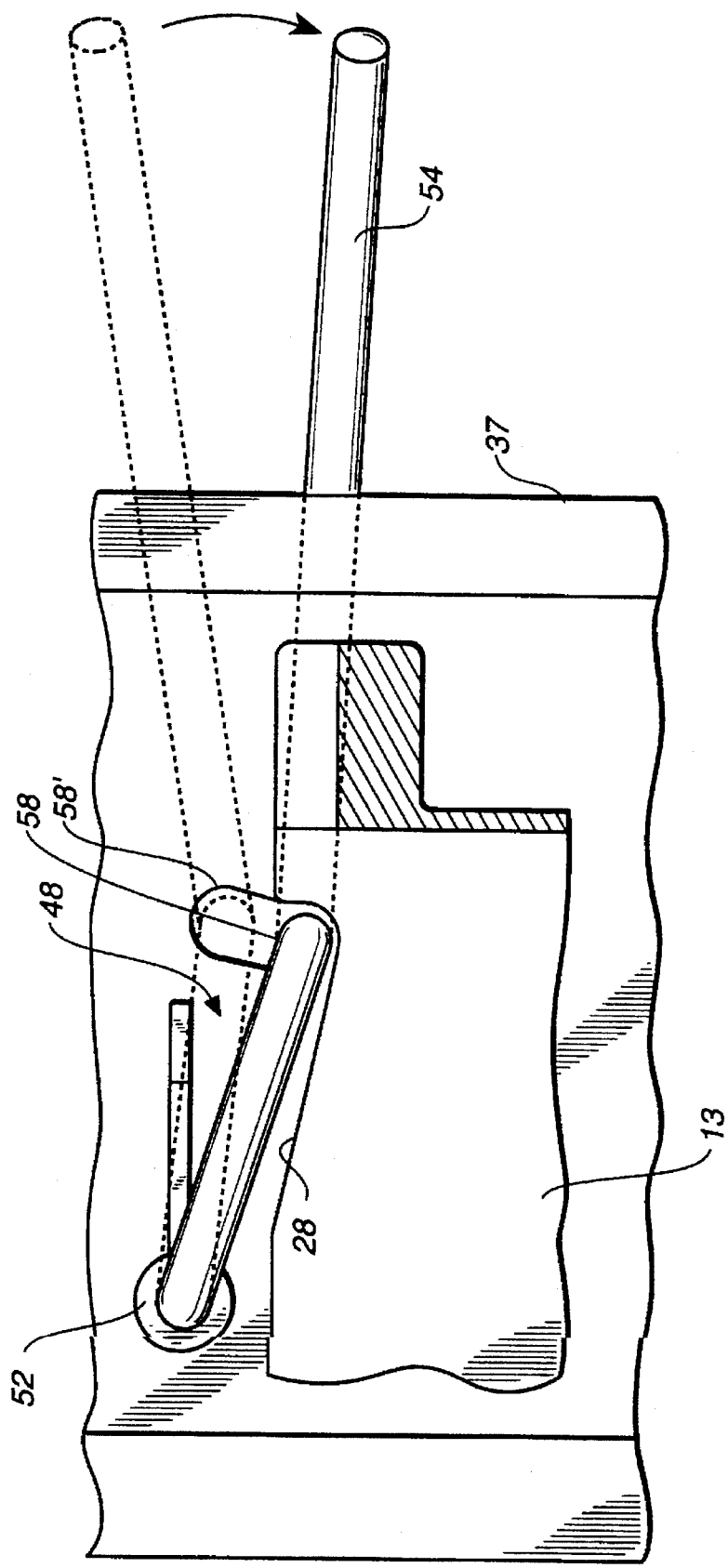
FIG._5D

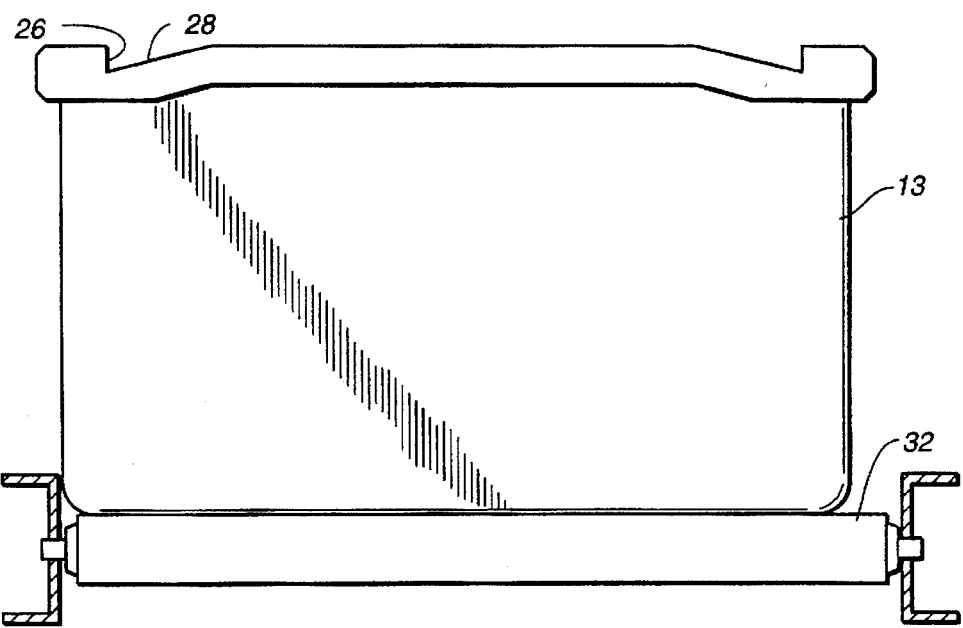
FIG._6A
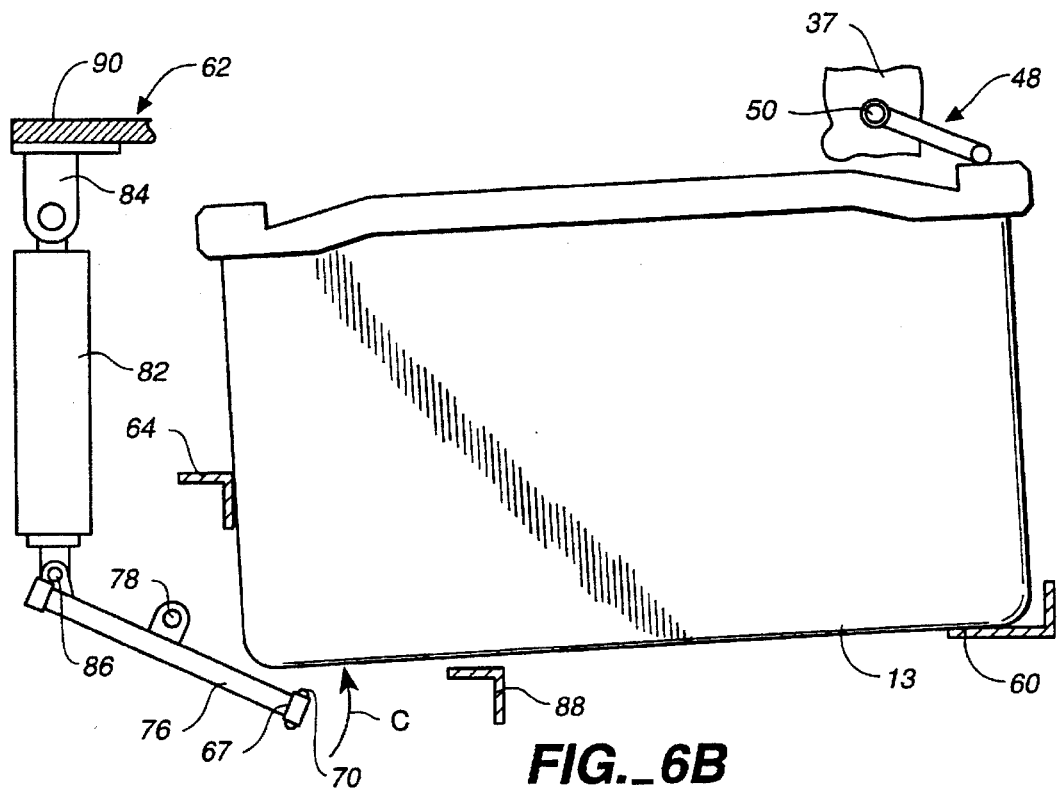
FIG._6B

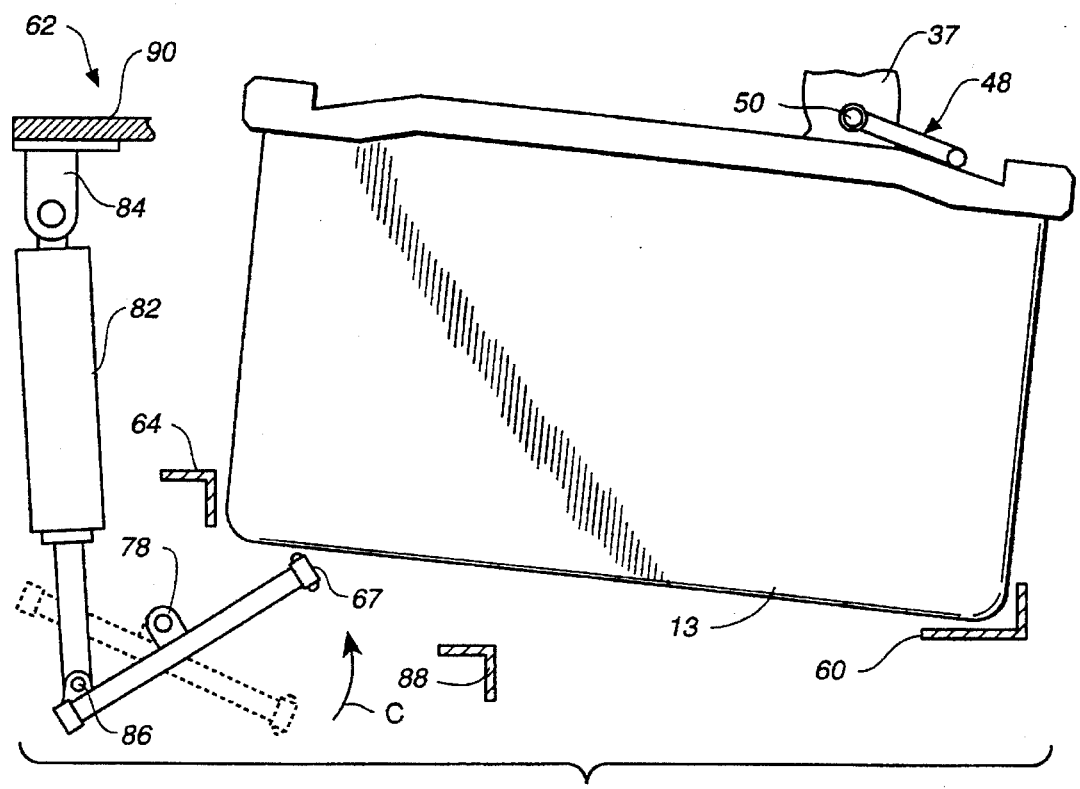
FIG._6C
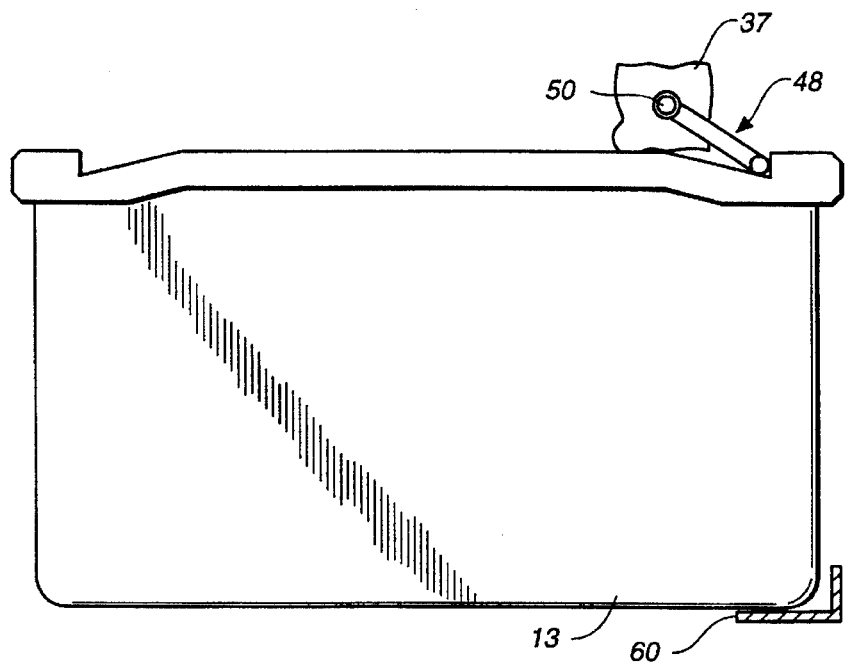
FIG._6D

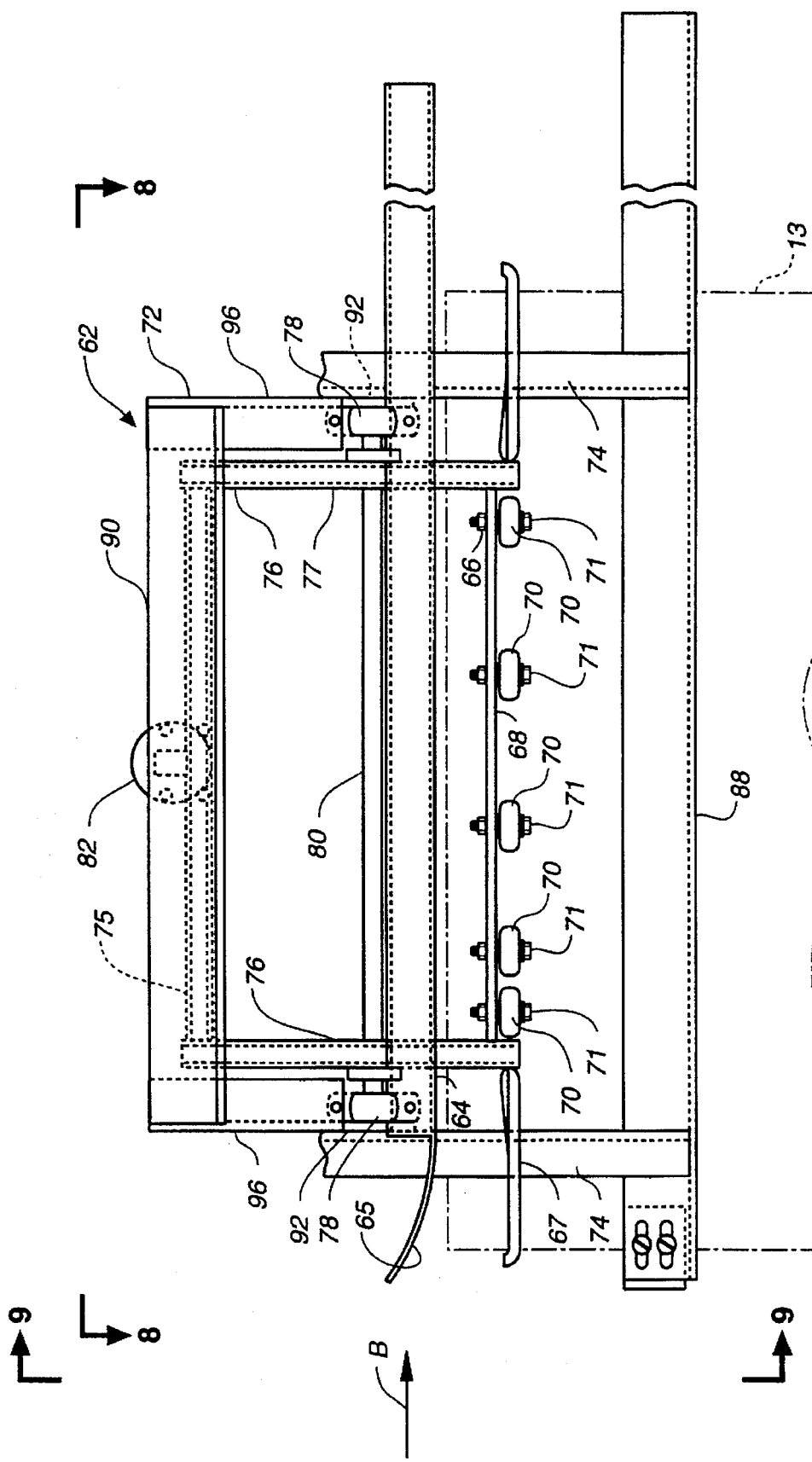
FIG._7

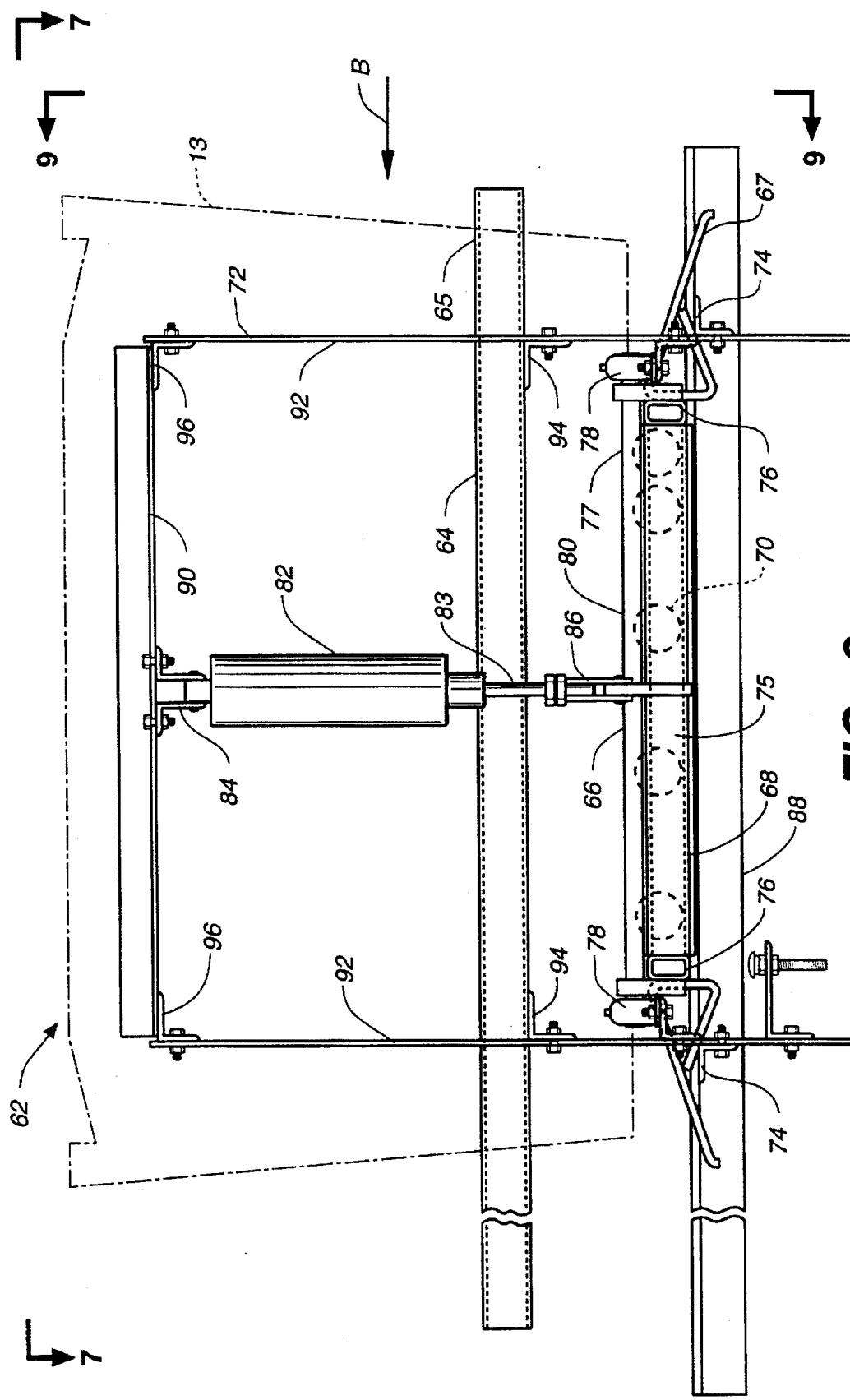
FIG._8

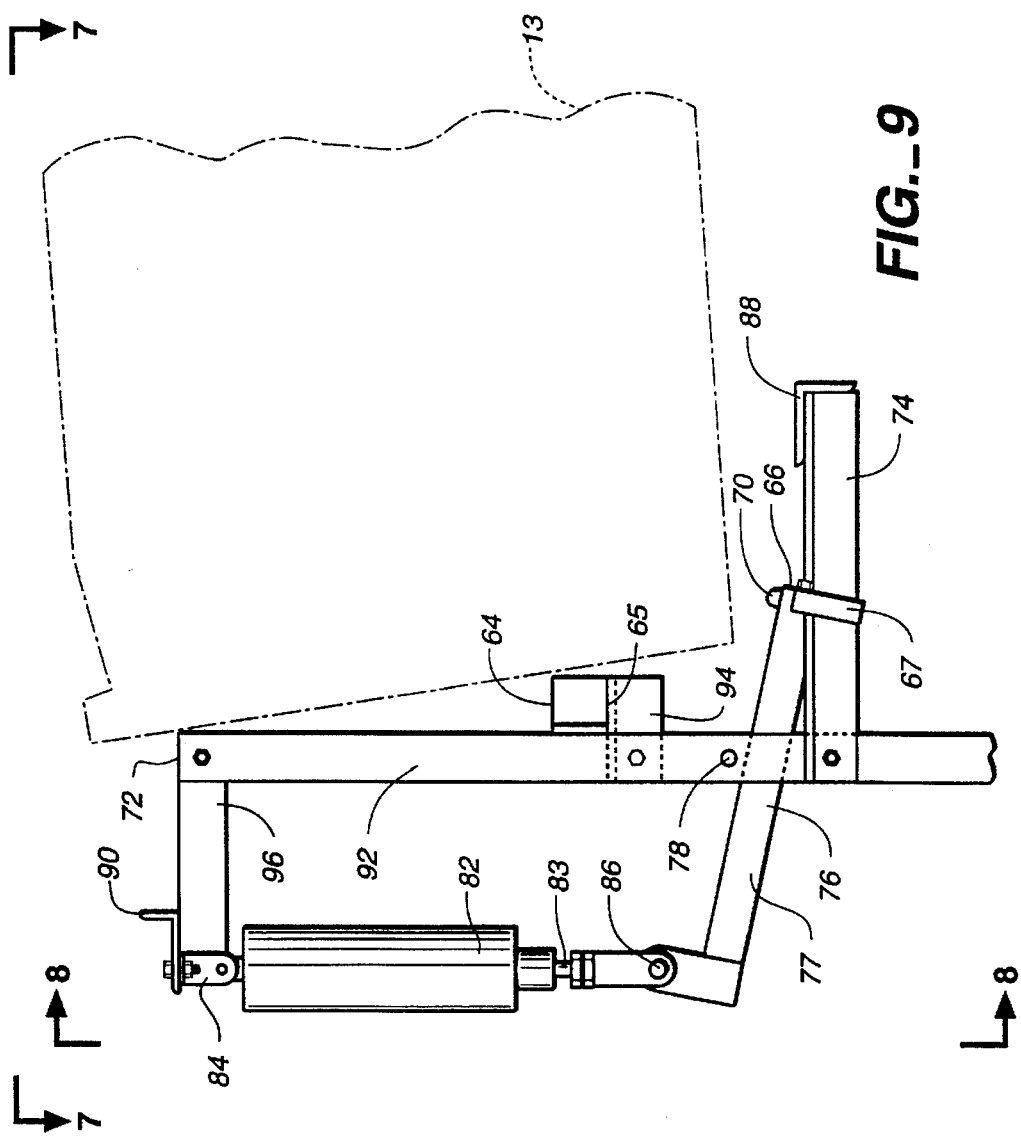

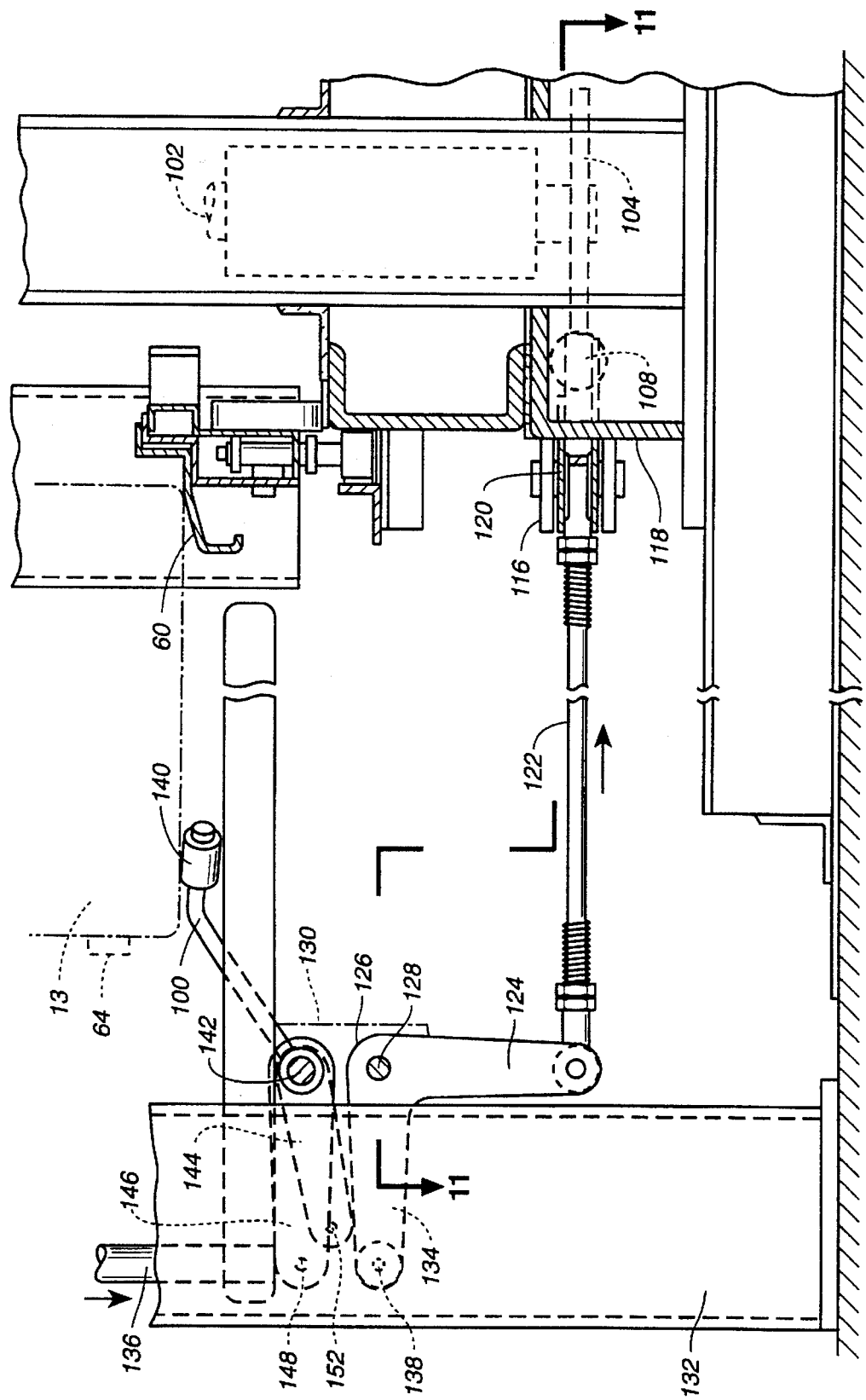
FIG._10

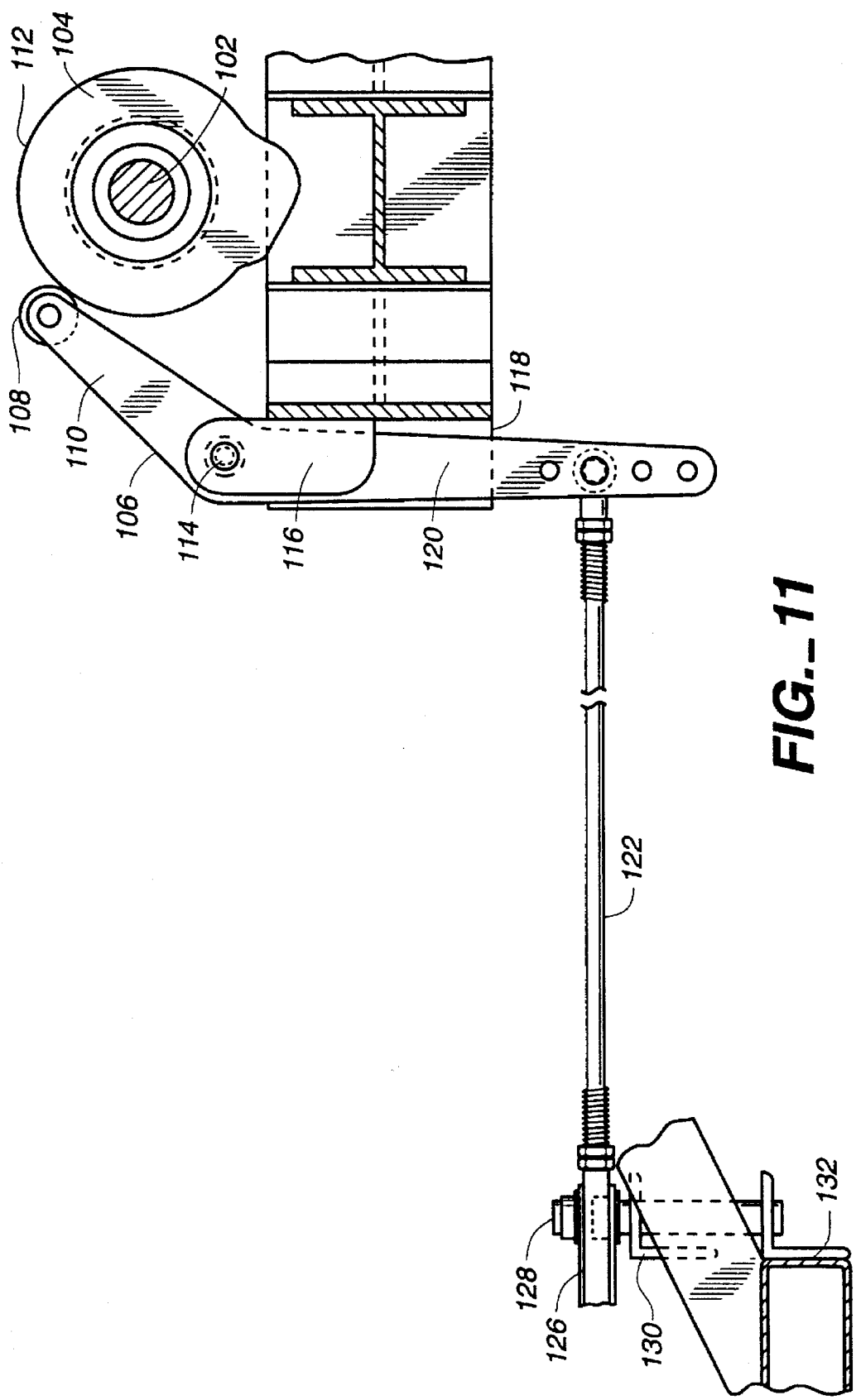
FIG._11

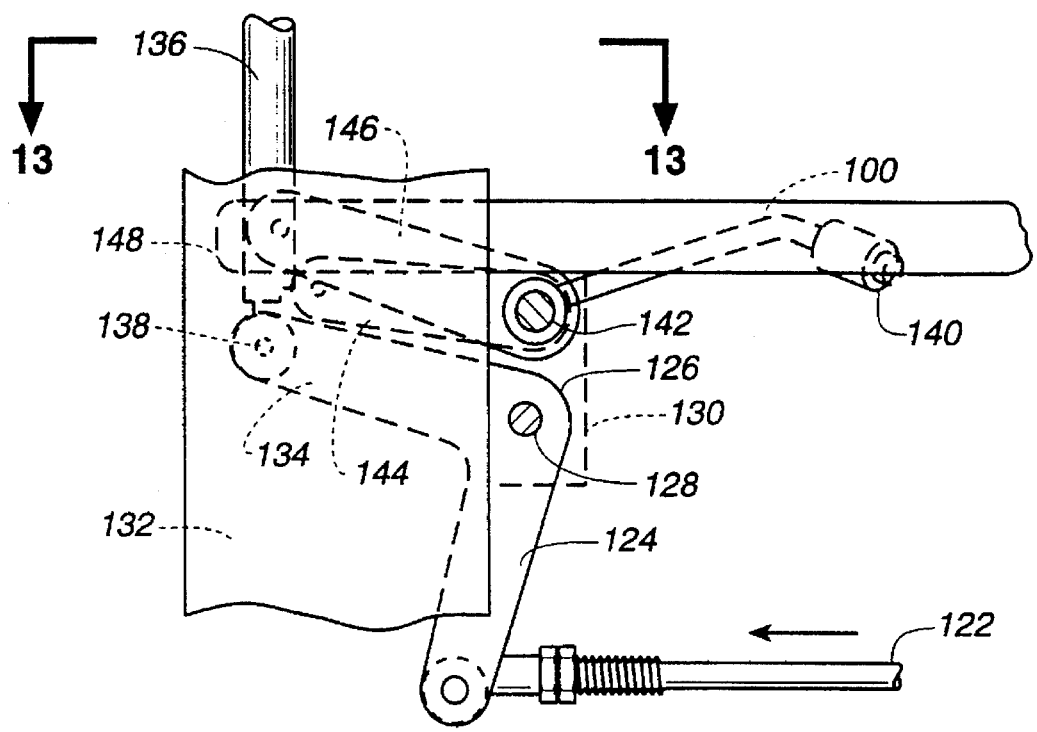
FIG._12
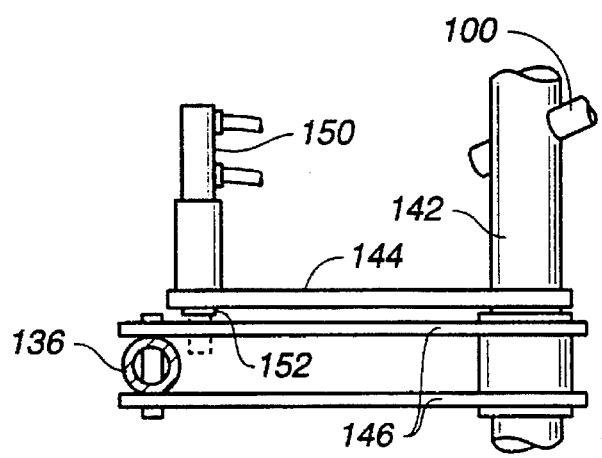
FIG._13

INSERTER FOR A ROTATABLE STORAGE STRUCTURE

This is a divisional of application Ser. No. 08/193,827, filed Feb. 7, 1994, abandoned.

BACKGROUND OF THE INVENTION

The present invention relates generally to automated distribution systems for storing and retrieving goods, and more particularly, to an insert and lift subassembly for inserting containers onto a rotatable storage carousel.

Many modern production and warehousing facilities require the storage and retrieval of thousands of inventoried items. Often goods must be stored in bins or containers due to their size or delicate construction. Therefore, storage requires loading the containers and delivering them to a known location where they can later be retrieved as necessary. When an order is received for an item, the desired item must be retrieved from its location and prepared for shipping or otherwise put to use. An efficient storage operation requires the ability to both store and retrieve a wide variety of goods and to rapidly and effectively dispose of the retrieved goods.

Such a warehousing and distribution system is disclosed in U.S. Pat. No. 5,238,351 issued Aug. 24, 1993, the entire disclosure of which is hereby incorporated by reference. This system is designed to deliver goods at very high rates. It may include one or more storage carrousels for receiving and storing containers adapted to carry material goods. A carousel includes a multiplicity of connecting rack arrays arranged in side-by-side fashion. Each of the rack arrays includes a plurality of vertically spaced container racks for supporting selected containers, with the container racks from various rack arrays being arranged in a plurality of tiers. Structure is also provided for forming a continuous track and rotating the rack arrays about the continuous track.

A lift including a vertically traveling endless loop having an up travel reach and a down travel reach is provided for carrying the containers to the various carousel tiers. A plurality of platforms for supporting individual containers are uniformly spaced about the lift's endless loop. Each carousel tier is provided with inserter and extractor assemblies suitable for loading and unloading, respectively, containers from the various racks while the carousel remains in continuous motion.

The storage system may include an automated control system including a storage facility controller for managing the activities of the system as a whole. The storage facility controller may maintain a storage record that remembers the identity and storage position of each of the containers stored within its control. A plurality of carousel controllers can be provided to manage the activities of a particular storage carousel. The carousel controllers may communicate with the storage facility controller over a first local area network. Each carousel controller in turn controls specific mechanical and electrical components of the carousel. The carousel controller may communicate with its associated components over a second local area network.

As will be described in greater detail below, the inserter assembly of the system described in U.S. Pat. No. 5,238,351, and used heretofore, contains an inclined parallel guide strip used to lift the lower outer edge of the containers as they are inserted onto the carousel. This guide strip lifts not only the containers which are being inserted, but also the already inserted containers when they pass by the inserter assembly and over the guide strip. The guide strip is inclined so that the containers are lifted as they pass over it. During this time, the leading portion of the containers is pushed higher than the trailing portion, resulting in mechanical stresses imposed on the containers which may eventually lead to container failure.

The lower outer edge of the container must be lifted in order for notches on the leading and trailing sides of the rim of the container to engage hooks provided on the storage rack for cantilever support of the container. The container may engage the trailing hook with motion in a lateral and slightly upward direction, and the hook must slide over the corner of the container and into the notch provided. To this end, it is advantageous for the bottom surface of the trailing hook to be smooth and continuous. Such a hook is shown in U.S. Pat. No. 4,968,207, issued Nov. 6, 1990. The leading hook is engaged initially by the container with a forward motion, and some arrangement should be provided to prevent the leading side of the container from hitting the leading hook. In the carousels known heretofore, this was an inclined bar, attached to the leading hook, which was intended to slide over the top of the leading side of the rim of the container. This is shown in U.S. Pat. No. 4,983,091, issued Jan. 8, 1991. It was possible, however, for this bar to be caught in a notch provided on the leading side of the rim of the container or between the upper inside edge of the container and the carousel, and cause the insertion operation to fail. The present invention overcomes this disadvantage by replacing the inclined bar with an inclined wing sufficiently wide to rest on the upper leading inside corner of the container until it hangs over the inside of the container. The inclined wing may be sufficiently wide not to fit into the notch of the container. Since the last step of latching the container with the leading hook is a motion in a lateral and slightly upward direction, it is advantageous for the bottom surface of the hook to be smooth and continuous, as discussed for the trailing hook.

Accordingly, an object of the present invention is to provide an inserter assembly which lifts the lower outer edge of the containers only when they are inserted onto a rotating storage carousel.

Another object of the present invention is to provide an inserter assembly which maintains the leading portion of a container level with its trailing portion as the container is inserted onto a rotating storage carousel.

Yet another object of the present invention is to provide a leading hook for a carousel storage rack that facilitates proper latching.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the claims.

SUMMARY OF THE INVENTION

The present invention is directed to an insert and lift subassembly for a storage carousel, having a movable lifting member. The lifting member is disposed beyond an outlet end of an approach section to the carousel. The subassembly further comprises means for raising the lifting member.

When a container is not being inserted, the lifting member is kept at a first position such that it does not interfere with the motion of containers on the carousel as they pass the inserter assembly. When a container is being inserted and latched onto the carousel, its outer lower edge needs to be lifted to tilt the container toward the carousel. When necessary, the automated control system causes the lifting member to be raised to lift the edge of the container. The lifting member may be provided with rollers to reduce friction.

A leading hook of a carousel storage rack is provided with an inclined wing capable of sliding over the leading side of the rim of a container that is being inserted into the rack. The inclined wing is sufficiently wide to rest on the upper leading inside corner of the container until it hangs over the inside of the container.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

FIG. 1 is a diagrammatic plan view of a warehousing and distribution system that incorporates a multi-level storage carousel requiring an inserter assembly as provide the present invention.

FIG. 2 is a diagrammatic plan view of the inserter and extractor assemblies positioned at a corresponding end of a multi-level horizontally rotating storage carousel.

FIG. 3 is a block diagram of a representative facility control system.

FIG. 4 is a perspective view of a suitable container.

FIG. 5A is a schematic plan view of a container hooking arrangement.

FIG. 5B is an enlarged plan view of the container hooking arrangement at the leading corner of the container.

FIG. 5C is an elevational view of the hook for the leading corner of a container along lines 5C—5C of FIG. 5B.

FIG. 5D is a side view of the container hooking arrangement along lines 5D—5D of FIG. 5B, with the inclined wing eliminated for sake of clarity.

FIGS. 6A–6D are a sequence of schematic elevational views of the latching of a container as it is inserted onto a rack generally along lines 6A—6A, 6B—B, 6C—6C, and 6D—6D, respectively, of FIG. 2.

FIG. 7 is a plan view of a rack and inserter subassembly in accordance with the present invention.

FIG. 8 is a side elevational view along line 8—8 of FIG. 7 and 8.

FIG. 9 a side elevational view along line 9—9 of FIGS. 7 and 8.

FIG. 10 is a schematic side elevational view of an arrangement where the timing of the insert and lift assembly is controlled mechanically.

FIG. 11 is a plan view along line 11—11 of FIG. 10.

FIG. 12 is a schematic side elevational view of a portion of the arrangement of FIG. 10, showing a lift arm in a position where it does engage the bottom of a container.

FIG. 13 is a view along line 13—of FIG. 12.

FIG. 12

DESCRIPTION OF THE PREFERRED EMBODIMENT

Turning now to the drawings, wherein like components are designated by like reference numerals throughout the various figures, FIG. 1 shows a storage and warehousing system 5 wherein the present invention can be applied.

This storage and retrieval system includes a plurality of components adapted to integrate the loading and unloading of containers onto a rotary storage carousel 2 that remains in continuous motion. The storage and retrieval system may include one or more multi-level storage carrousels 2, each having an associated lift 4, together with a plurality of inserter assemblies 6 and extractor assemblies 8.

In the embodiment chosen for the purpose of illustration, storage carousel 2 forms a horizontally traveling endless conveyor that carries a plurality of rack arrays about an oval track in the direction of arrow A. Each rack array includes a plurality of vertically spaced container storage racks 12. The rack arrays are arranged in side-by-side relationship so that their respective racks are arranged in tiers, one above another. The rack arrays are parallel to each other and the racks in the various tiers are aligned perpendicularly with respect to the ground.

A suitable frame structure is provided to support the multiple tiers of storage racks. Each storage carousel includes an upper track and a matching lower track. The tracks for each carousel may be identical and continuous, oval-like in shape with rounded ends and parallel sides. The rack arrays are moved along the racks by a plurality of electrically or hydraulically operated motors (not shown). For a more detailed understanding of how a suitable rotating storage carousel may be constructed, reference is made to an acceptable structure as disclosed in U.S. Pat. No. 4,422,554, issued Dec. 27, 1983.

By way of example, each rack array may include a pair of spaced columns attached to the frame onto which a plurality of latching mechanisms are placed to form portions of the vertically spaced racks 12. In a carousel eight tiers high with the rack arrays on 40 inch centers and rated to hold 500 pounds per rack, three 5 hp motors spaced along the carousel are suitable to drive the carousel at speeds up to 50 feet per minute. An idler drive may also be provided to facilitate attaching another motor to drive the carousel should the needs of the system call for a backup motor.

At one end of the storage carousel 2, a lift 4 is provided for carrying containers 13 to and from each of the rack tiers. Each tier has an associated inserter assembly 6 and an extractor assembly 8. As seen in FIGS. 1 and 2, the insertion and extraction operations may take place on one end of the storage carousel. However, it should be appreciated that if the demand is expected to be particularly heavy, higher picking volumes can be obtained by adding additional inserter and/or extractor assemblies to the opposite end of the carousel.

A conveyor network 14 is provided to transport containers 13 to and from the storage carousel 2. Specifically, containers 13 are transported to the storage structure via supply conveyor 15, while take-away conveyor 16 carries extracted containers away from the storage structure.

Assuming, by way of explanation, that operation of the system commences with the insertion of containers 13 into the system, containers 13 are delivered to the storage carousel 2 via supply conveyor 15. As the containers arrive, they are passed through one or more holding stations 18 (see FIG. 2) before being delivered to a platform 29 of lift 4. A holding station acts essentially as a queue for temporarily holding containers until an empty lift platform is positioned adjacent the final holding station and ready to receive the container stored thereon. Additional holding stations in effect serve as an extension of the "queue." Holding stations are desirable since containers are likely to be delivered to the storage carousel at random time intervals for insertion.

Once a container has been deposited onto a lift platform 29, it is elevated to an inserter assembly 6 corresponding to the carousel tier at which the container is to be placed. The container is then off-loaded unto a holding shelf or section 30 of the inserter assembly 6. The actual construction of the lift assembly may be varied, with suitable structures being disclosed in U.S. Pat. No. 5,238,351. The container is held within the inserter assembly until an empty rack passes by. When an empty rack passes, the container is attached to the rack without requiring the carousel to stop or even slow down.

Each time a container is inserted, the rack position (by tier and rack array) at which the container is stored is electronically recorded so that the container can be accessed at any desirable time in the future. A computerized storage facility controller maintains a storage record indicating the position at which each particular container is placed on the storage carousel.

When a request is made for goods stored within a particular container, the controller determines the container holding the desired goods by checking an inventory record. Once the identity of the desired container is determined, the storage record is searched to determine the specific rack position at which the container is held. When a request is placed for a particular container, the extractor assembly waits until the rack 12 that holds the desired container passes by. As the rack passes by, the container is detached from the rack and pulled into the extractor assembly 8. The container is maintained within the holding section 25 of extractor assembly 8 until a suitable opening occurs on a lift platform 29 (which will be moving along a down travel reach), and the container can be moved onto lift 4. The lift carries the container to a take-away conveyor 16 which delivers the containers to the conveyor network 14.

Presence scanners 20 (FIG. 1) may be positioned throughout the system to detect the presence or absence of containers at each critical position. For example, scanners 20 are provided to monitor each of the holding stations, and at each tier level of the lift on both the up travel and down travel reaches. The presence scanners thus provide the system controller with important feedback as to the position of the containers it controls. It will be appreciated, for example, that if a particular lift platform 29, holding station 18, inserter assembly 6 or extractor assembly 8 is full, then the system must be disabled to the extent that no other containers will be directed toward that particular unit until it has sufficient room. Thus, the presence scanners 20 are intended to prevent the system from overrunning itself.

One or more identification scanners 22 (see FIG. 1) may also be disposed throughout the system to read the identifying indicia 23 (see FIG. 4) on the sides of the containers 13. Specifically, it is desirable to identify the containers as they approach the storage carousel, since they are likely to be delivered on a random basis. Further, a plurality of identification scanners 22 are preferably positioned to view containers carried by the storage carousel 2 just after each inserter assembly to verify the identity of the specific containers carried by the carousel. Such scanners also are effective to rapidly reidentify the containers stored on the carousel in the event that the system controller loses its data indicative of the carousel's contents.

It will be appreciated that a wide variety of automated controllers could be developed to drive the disclosed warehousing system. A good control system must lend itself to a modular construction so that if and when the needs of the distribution system change (the desired volume often tends to rise), additional storage carrousels or insertion and extraction mechanisms may be added to the system with little or no change to the system software. Further, it is contemplated that the storage structure of the present invention may be incorporated into a fully automated distribution system. Therefore, the controller is adapted to lend itself to modular integration with other components of an automated distribution system.

Activities relating to the storage structure are controlled by a storage facility controller 46 (FIG. 3) that is responsible for remembering which of the containers are within its possession, the storage carousel upon which each of the containers 13 are hung and the actual position, (by tier and rack number) at which the container is stored. Additionally, the storage facility controller is responsible for coordinating communications with external systems as well as overseeing the insertion and extraction of containers from the various carrousels.

A representative embodiment of a control system is shown in FIG. 3. As seen therein, the storage facility controller manages a plurality of carousel controllers 41, 45, each of which is associated with a particular storage carousel 2. The storage facility controller 46 may be either an integrated computer that is directly accessible by the user to input orders and the like, or it may communicate with an external master controller and/or other components. Typically, container requests would be generated either internally or externally in the form of an extended list of desired containers, together with an indication of the number of containers to be provided at any given time. It will be appreciated that the acceptable container list can be extended and considerably longer than the actual number of containers desired. Of course in an alternative embodiment, individual requests for particular containers could be made.

When an extraction request is made, the storage facility controller 46 surveys the storage records to determine where the requested containers are positioned within the various storage carrousels 2. Then, knowing the positions of the requested containers, the pending extraction requirements and the openings on lift 4, the storage facility controller decides which of the listed containers is easiest to access and should be provided. The storage facility controller then sends an extraction command to the carousel associated with the storage carousel that holds the desired container. The message indicates to the carousel controller only that the container in a particular storage rack should be removed. The carousel controller 45 issues appropriate signals to cause an extraction of the desired container. It then reports to the storage facility controller 46 whether or not the extraction was successful.

To ensure that the storage facility controller 46 has the latest information about the contents of the storage carrousels 2, the plurality of identification scanners 22 are provided as previously described to read the identifying indicia 23 attached to the sides of containers 13. The identification scanners are preferably disposed just after the inserter and extractor assemblies to verify inspection and extraction events. Each time a rack array passes by the identification scanners 22, the identity of the containers is reported to the carousel controller 45, which in turn reports both the container numbers and the storage rack positions to the storage facility controller 46.

The carousel controllers 41, 45 each control the detailed operations of their associated storage carousel 2, along with its associated inserter assemblies 6, extractor assemblies 8, and lift 4.

As shown in FIG. 4, containers 13 are preferably open boxes that are sized appropriately to receive stored goods. In the embodiment described, containers 13 are adapted to be hung on carousel storage racks 12. The containers are preferably substantially square so that they may be hung on the racks in any orientation. They are sized to suit the needs of the particular storage application. The containers must be large enough to hold reasonable quantities of inventoried goods, such as clothing; yet they must be small enough so that an operator can readily pick the goods therefrom. By way of example, 36×36×21" containers are suitable for most consumer product applications. In applications where extremely small parts or small numbers of each item are inventoried, smaller containers on the order of 24×24×12" would be appropriate.

The containers 13 may be formed from a molded fiberglass reinforced resin material. As seen in FIG. 4, a suitable container 13 includes an upper rim 24 having a pair of shoulders 26 formed at each of its upper corners. The shoulders 26 are formed by a gradual depression or notch 28 in upper rim 24. The shoulder arrangement lends itself to what may be described as a cantilevered support by the racks to the storage carousel as described below.

Each container has an identifying indicia 23 that individually identifies the particular containers. By way of example, the containers may be numbered sequentially with the numbers being applied in bar coded form to each exterior corner of the container. Bar code labels may be readily printed and adhered to the four corners of the container. It is desirable to label each corner so a single scanner can identify the container regardless of its orientation as it passes by the scanner. With larger containers it also may be desirable to control the orientation of the container when it is presented to an operator. In such systems, the bar code labels would further identify each particular corner so as to allow a work system controller for example to rotate the container in a manner such that the material to be removed from or inserted into the container is always facing the operator.

In most warehousing operations, the sizes of stored goods will vary widely. Thus, for compatibility relatively large containers may be used so that only one or two container sizes need be handled by the warehousing system. To minimize the empty shelf space, many of the containers would be subdivided into multiple compartments 27 by placing wall inserts 33 into the container. Generally, there would be containers having a wide range of compartment sizes within the warehousing system, with the actual number of containers having a given compartment size being entirely dependent on the nature of the goods being stored. To maximize flexibility, wall inserts 33 may be removable so that the number of compartments within any container may be readily altered. To facilitate automatic control, each compartment 27 has a specific designation.

To insert a container 13 located within inserter assembly 6 onto an approaching empty rack 12 of the carousel, the container called for is transferred by rollers from a holding section or shelf 30 to an approach section 19 immediately downstream from the holding section. The holding shelf and approach section are part of the inserter assembly 6. The container is then engaged by comparable power actuated traction rollers 32 of the approach section. See FIGS. 2 and 6A.

Referring to FIG. 2, the operation of the traction rollers 32 will be described. The traction rollers are interconnected via gearing which serves to drive the rollers. As described in U.S. Pat. No. 5,238,351, the disclosure of which has been incorporated by reference, the traction rollers are interconnected with the power source that drives the storage carousel so that the rate of travel of the containers within the approach section 19 matches the rate of travel of the carousel racks as the containers pass an outlet end 31 of the approach section ready for insertion.

To be certain that the containers leaving the approach section will be in alignment with the appropriate rack and close enough for effective engagement, there is provided an oblique guide strip 34. By virtue of its obliquity, the oblique guide strip 34 physically directs containers propelled by the traction rollers 32 to a proper position with respect to the storage carousel.

In an inserter known heretofore, as the container leaves the downstream end of an approach section, it is propelled by the trailing rack column into a position of engagement with a carrier leg and a vertical leg of an inclined parallel guide strip (not shown). As described in U.S. Pat. No. 5,238,351, various movements of the container may be accomplished by the guide strip. By having the guide strip pitched obliquely upwardly, the level of the bottom of a container may be brought approximately even with the level of the rack where the adjacent edge approaches a rack positioning strip. Also a vertical leg of the guide strip may be disposed at a right angle relative to the guide strip carrier leg and the carrier leg may include a leaf spring to shift the containers laterally toward the rack positioning strip for proper latching. However, the guide strip not only lifts the containers being inserted onto the carousel but also those already on the carousel as these containers pass over the guide strip.

In a preferred embodiment of the present invention, the latching means takes the form of hooks 48 mounted on each carousel storage rack 12 (FIG. 5A). Each storage rack comprises a leading and a trailing column 37 and 36, respectively (see FIGS. 2 and 5A), between which a container can be inserted. The container is held against the rack by hooks 48 and is supported and slides, during and after insertion, along a continuous, horizontal, backstop and stationary positioning strip 60 (see FIGS. 6B–6D). Referring specifically to FIGS. 5B, 5C and 5D, hook 48 is shaped roughly in the form of the letter S and has a captive end 50 pivotally secured in a bushing received by a bearing hole 52 in one of the trailing columns 36 or leading columns 37 of rack array 10. It will be appreciated that columns 36 and 37 extend the height of the storage carousel and form the walls of rack array 10. The hook configuration, except for wing 51 discussed below, is substantially the same for both columns 36 and 37. The hook 48 has a free end 54 at the end of a lever arm 56. Intermediate opposite ends of the hook 48 is a transversely disposed latch bar 58 which is adapted to engage the shoulder 26 of container 13. That is, the latch bar 58 is adapted to fall into the gradual depression in the upper rim of container 13, which forms the container notch 28, as the hook 48 swings pivotally about the wall of the bearing hole 52. The latch bar 58 extends through and moves freely within a slot or hole 58' (see FIG. 5D) in a column 36 or 37 of the frame. It is also desirable for the bottom surface of the hook to be smooth and continuous, to prevent the side of the container facing the carousel from colliding with the hook. This can be accomplished, for example, by forming the hook by bending a bar in a plane in the form of the letter S as shown in FIGS. 5A–B. The container can be unlatched by applying an upward work force to the free ends of the hooks holding it. The hook attached to the leading column 37 also has an inclined wing 51 (FIGS. 5B, 5C) which slides over the leading side of the rim of the container as it is inserted to ensure that the hook is raised over the leading side of the rim of the container rather than hit the leading wall of the container. Wing 51 is substantially planar and substantially rectangular, triangular, trapezoidal or shaped as a sector of a circle, with a base attached to the hook. It may be inclined, with respect to the plane of the hook, at an angle θ (FIG. 5C) of approximately 30°. The wing may be narrower near the hook than at the opposite end. Wing 51 may also be sufficiently wide not to fit into notch 28 (FIGS. 4 and 5A) on the leading side of the rim of the container. By way of example, the wing may be substantially trapezoidal with the larger base approximately 5.25 inches long.

As noted, each storage rack 12 includes a pair of hooks 48 mounted on opposite columns of the rack array in a facing relationship. Thus, a hook 48 engages each inside corner that forms shoulder 26 of the container 13 to support the container in a cantilevered manner. It should be appreciated that in order for the hooking arrangement to be effective, each rack has a positioning strip and backstop 60 disposed in a position to be engaged by the bottom portion of the container. Specifically, the bottom of the inside wall of the container abuts against the backstop 60 (FIGS. 6B–6D). This insures that the container will not drop off of the hooks.

In order for the latching to occur, the outside (relative to the rack) lower edge of the container must be raised above the level of backstop 60, as shown by arrow C in FIGS. 6B–6C, thus tilting the container towards the carousel. In the inserter known heretofore, an inclined parallel guide strip was used. Since the guide strip is fixed, it raises not only those containers which are inserted but also already inserted containers as they pass over it. As the edge is being raised by this guide strip, the container edge tends to be inclined as well, leading to container deformation and possible failure.

The present invention overcomes this disadvantage by replacing the inclined parallel guide strip with an insert-and-lift subassembly 62 located as shown in FIG. 2 and shown in detail in FIGS. 6B–6C and 7–9. In FIGS. 6B–6C and 9, the container is shown as moving into the drawing sheet. In FIGS. 7–8, the container moves in the direction of arrow B.

The entire subassembly 62 is supported by stationary frame 72. The frame includes two vertical beams 92, each carrying a bearing 78, horizontal beam 90 extending between beams 92 and connected to them by beams 96, and brackets 94 attaching lateral guide strip 64 to beams 92. By way of example, brackets 94 and beams 96 may be bolted or otherwise suitably secured to the members they connect.

The subassembly further includes a movable lifting member 66 comprising beam 68 and rollers 70. The rollers are pivotally attached to beam 68 using, for example, nut-and-bolt assemblies 71.

A pivoting frame 77 comprises lifting member 66 as one of its sides. Two beams 76 form the sides of frame 77 adjacent lifting member 66 and beam 75 forms the opposite side of the frame. Frame 77 is pivotally connected to stationary frame 72 at bearings 78 connected by bar 80. The pivoting axis of the frame is substantially parallel to lifting member 66 and to the direction of motion of the portion of the carousel adjacent the insert and lift assembly. The centers of bearings 78 are positioned such that the plane containing them and the top of rollers 70 is substantially parallel to the plane of pivoting frame 77.

Frame 77 can be moved relative to frame 72 by a piston-cylinder arrangement 82. The piston-cylinder arrangement may be attached to beam 90 of stationary frame 72 using bracket 84. Push or piston rod 83 may be attached to beam 75 of pivoting frame 77 using bracket 86. The piston can be hydraulic or pneumatic. When the piston-cylinder lowers beam 75, frame 77 pivots around the axis of bar 80 thus raising lifting member 66.

In order to prevent containers from colliding with the ends of guide strip 64 and lifting member 66, the guide strip and the lifting member have angled ends 65 and 67, respectively. A horizontal beam or blocking member 88 held by two beams 74 extends along the direction of motion of the containers below the level of backstop and positioning strip 60 to prevent the containers from falling if they are not latched properly by blocking their fall.

During normal operation, the containers are not held by beam 88. Before latching, they are supported by positioning strip and backstop 60 and lean against lateral guide strip 64 as shown in FIG. 6B. After latching, they are suspended and held by positioning strip and backstop 60 and by hooks 48. A sensor (not shown) detects the improper latching and alerts the carousel controller (41 or 45 in FIG. 3) which stops the carousel to prevent damage or injuries. The improper latching may be detected by sensing the incorrect positioning of hook 48. As shown in FIGS. 6B and 6C, lifting member 66 can engage the lower outer edge of a container which is being inserted into the carousel and lift it in order to latch the container into its rack. During this time, the edge is kept horizontal so there is minimal stress on the container.

The lifting of member 66 is timed by the carousel control system through the interface board which controls the inserter, to take place only when a container which is being inserted passes above it. At all other times, lifting member 66 is kept at a low position and is cleared by those containers which have already been inserted into the carousel.

FIGS. 10–13 show an alternative embodiment of the present invention where the timing of the insert and lift assembly is accomplished mechanically rather than electronically. In this embodiment, one or more lift arms 100 are provided for lifting the outside edge of containers 13 during their insertion. The arms are synchronized with and driven by a carousel drive shaft 102 (FIGS. 10 and 11). When a container that is being inserted passes the insert and lift assembly, the lift arms 100 are triggered for action. A lift arm cam 104 is keyed to the drive shaft 102 so that the lift arm cam is rotating at all times during operation of the rotary storage system, FIGS. 10 and 11. A bell crank cam follower 106 is provided with a roller 108 on an arm 110 and engages a cam track 112 of the lift arm cam 104. A pivot pin 114 mounts a bell crank cam follower 106 on a bracket 116 of a frame section 118. A second arm 120 has attached to it a rod 122 which extends toward the left, as viewed in FIGS. 10–12, to a position of engagement with an arm 124 of a bell crank 126. The bell crank is mounted by a pivot pin 128 on a bracket 130 on an adjacent frame section 132. A second arm 134 of the bell crank 126 is attached to a reciprocating rod 136 at a pivot point 138. The reciprocating rod is long enough to extend upwardly throughout all levels of the rotary storage system. The train of connection just recited makes certain that as long as the storage carousel is in operation, the reciprocating rod 136 is constantly reciprocating. Despite the constant reciprocation of rod 136, the lift arms 100 are operated only when called upon.

Lift arms 100 with appropriate rollers 140 at their free ends are attached to a common rotatable drive rod 142. The drive rod, pivotally mounted on the bracket 130, has anchored to it a drive lever 144. There is in addition a drive link 146, one end of which has a pivot attachment 148 to the reciprocating rod 136 and the other end of which is pivotally mounted on the drive rod 142. In view of this pivotal relationship in spite of constant reciprocation of the rod 136, the lift arms 100 and rollers 140 remain fixed in position at a location where they do not engage the bottom of containers 13.

A reciprocating cylinder 150 mounted adjacent the end of the drive lever 144 is provided to operate the lift arms at the appropriate times. An actuator pin 152 of the cylinder 150 is adapted to be extended to the phantom position of FIG. 13. When extended, the reciprocating activity of the drive link 146 is passed to the drive lever 144, which in turn causes the lift arms 100 to be elevated to the lifted position of FIG. 10. This results in lifting the outside edge of the container 13. The duration of the lift is determined by travel of the roller 108 of the bell crank cam follower on the cam track 112.

In summary, an apparatus and method for inserting containers into a rotating storage carousel has been described.

The present invention has been described in terms of a preferred embodiment. The invention, however, is not limited to the embodiment depicted and described. Rather, the scope of the invention is defined by the appended claims.

What is claimed is:

1. A rotary storage carousel including a multiplicity of container support racks arranged in side-by-side fashion and means for rotating the support racks so they travel about a continuous track, the support racks including leading attachment means for releasably securing a container thereto having a notched rim, said leading attachment means comprising an articulated member mounted to an associated support rack for releasable engagement with a shoulder on said notched rim of said container; and wherein said leading attachment means further comprises an inclined wing wider than a notch of said rim to ensure that said leading attachment means passes over said rim as said container is inserted onto a support rack while the support rack remains in continuous motion.

2. The rotary storage carousel of claim 1 wherein said inclined wing has a substantially trapezoidal shape and forms an angle of about 30° with said articulated member.

3. The rotary storage carousel of claim 2 wherein each said articulated member comprises:
   a captive section that is pivotally attached to the associated rack; and
   a working section that is subject to movement between a position of engagement with a particular shoulder of an associated container and a position for disengagement from the particular shoulder in response to a work force.

4. The rotary storage carousel of claim 3 wherein said working section comprises an intermediate section for engagement with said shoulder and a free end section responsive to said work force.

5. A rotary storage carousel including a multiplicity of container support racks arranged in side-by-side fashion and means for rotating the support racks so they travel about a continuous track, the support racks having leading and trailing sides relative to a direction of motion thereof, the support racks comprising attachment means at the leading and trailing sides for releasably securing a container thereto having a rim with a notch, said attachment means at the leading side comprising a member mounted to its associated support rack for releasable engagement with a shoulder on said rim of said container; and wherein said attachment means at the leading side further comprises an inclined wing wider than the notch in the rim to ensure that said attachment means at the leading side passes over the rim as said container is inserted onto a support rack while the support rack remains in continuous motion.

6. The rotary storage carousel of claim 5 wherein said inclined wing is wider than said notch.

* * * * *